A. H. TAIT.
Apparatus for the Manufacture of Ice, Cooling Buildings, &c.
No. 144,577. Patented Nov. 11, 1873.
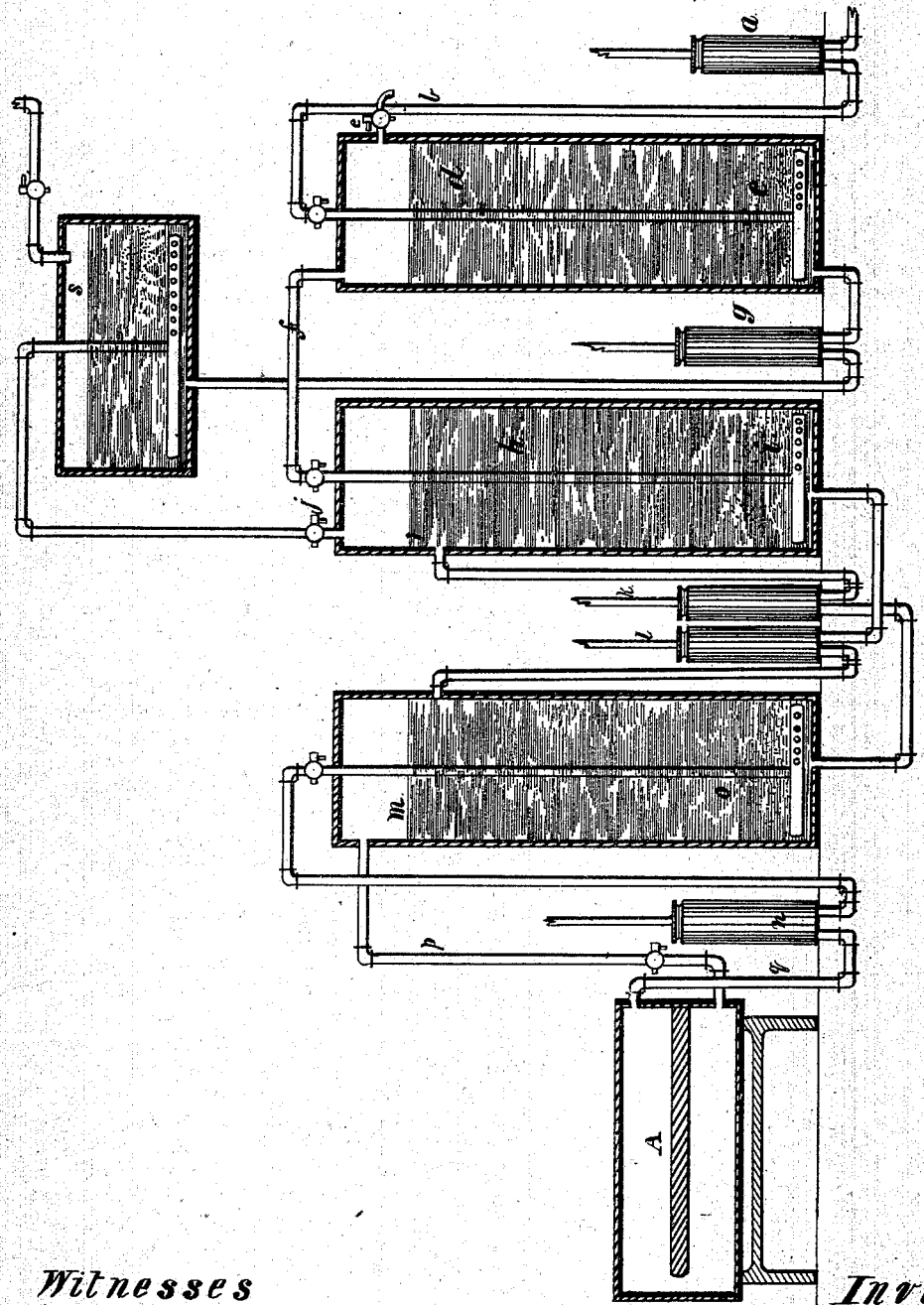
Witnesses
Thomas C. Commoren
Caroline A. Dolbear
Inventor
A H Tait

UNITED STATES PATENT OFFICE.

AUGUSTUS H. TAIT, OF JERSEY CITY, NEW JERSEY.

IMPROVEMENT IN APPARATUS FOR THE MANUFACTURE OF ICE, COOLING BUILDINGS, &c.

Specification forming part of Letters Patent No. 144,577, dated November 11, 1873; application filed July 23, 1873.

*To all whom it may concern:*

Be it known that I, AUGUSTUS HENRY TAIT, of Jersey City, Hudson county, New Jersey, have invented certain Improvements in the Apparatus for Manufacturing Ice, Cooling Buildings, and for general purposes of refrigeration, of which the following is a specification:

My invention consists in the production of cold by a peculiar arrangement of apparatus by which atmospheric air is compressed, cooled, and expanded more effectually than heretofore.

When atmospheric air is compressed in a close vessel up to a practicable working pressure—say, of seven atmospheres, or about one hundred pounds, per square inch—a certain and uniform number of units of heat can be abstracted from it, while heated, by compression, according to the temperature of the cooling medium by which it is surrounded, or which is injected into the compressed air, or through which the air is passed.

The object of this improvement, therefore, is to furnish a supply of cold water, at a low temperature, for the purpose of cooling the air during compression in warm weather, the degree of cold produced by expansion of the compressed air being in proportion to the temperature to which the air was reduced during compression.

$a$ is a force-pump to inject air through; $b$, the pipe to convey same to the centrifugal $c$, through which, furnished with perforated holes, the air compressed in $d$ passes, giving a rotary motion to $c$. $d$ is a vessel partially filled with cold water from the tank S by the pump $g$; $e$, the overflow-cock to allow the heated water to escape; $f$, pipe and cock to allow the compressed air to expand into the water-vessel $h$; $g$, the cold-water force-pump to supply the vessel $d$ from the tank S; $h$, a vessel partially filled with cold water, to be further cooled by expanded air. $i$ is a centrifugal pipe, with holes to allow the compressed air from $d$ to expand into the water in the vessel $h$. $j$ is a blow-off cock to allow the expanded air, on leaving $h$, to pass off into the water-tank S. $k$ is a force-pump to force the water cooled in $h$ into the cooling-vessel $m$; $l$, force-pump to force the water from $m$ back into $h$, to be again cooled in $h$; $n$, air-pump to force and compress air into $m$, to be cooled previous to expansion in A; $o$, pipe to convey air to centrifugal in $m$; $p$, the pipe to convey cold compressed air to expand in refrigerator A; $q$, pipe and cock to return air to force-pump $k$, to be again compressed and cooled in $m$; A, ice-box or refrigerating-chamber.

I am aware that Windhausen, in a reissue of his patent, No. 4,603, has proposed a method of cooling the air by using the air, after expansion in the refrigerator, to cool the air coming to the pump, by passing the expanded air through a vessel containing a number of pipes—the incoming air passing inside and the expanding air outside of the pipes; but practically this requires a very large surface, and atmospheric air can be only effectually cooled by being brought into direct contact with the cooling medium.

I am also aware that compressed and expanded air has been used by Gorrie and others to produce refrigeration, but only with partial success in warm weather, when most required, except at high and impracticable pressures. This arises from not being able to cool down the compressed air lower than the temperature of the water used—often 90° Fahrenheit. But with this improved method I am able, without difficulty, to obtain any degree of cold I require, by multiplying the principle used, so as to have the last cooling-water at the freezing-point. I can even, by using a non-freezing medium to cool the compressed air, obtain a temperature for the last expanded air of a very low temperature, as I gain from 40° to 50° temperature in each operation at moderate pressures.

There is also a great advantage in this arrangement in a saving of water where it is not plentiful, as it can be so arranged as to use it over again by repeatedly cooling it.

I claim as my invention—

1. The method of refrigerating by previously cooling the water or other liquid used to cool the compressed air, as set forth.

2. The pump $a$, the pipes $b$ and $c$, the vessel $d$, the pipes $e$, $f$, and $g$, the cooler $h$, the pipes $j$ and $i$, the pumps $k$ and $l$, or their equivalents, in combination with the cooler $m$, the pump $n$, the pipes $o$, $p$, and $q$, and the chamber A, or their equivalents, as and for the purposes hereinbefore set forth.

A. H. TAIT.

Witnesses:
 THOMAS C. CONNOLLY,
 CAROLINE A. DOLBEAR.